US009759277B2

(12) United States Patent
Kobayashi et al.

(10) Patent No.: US 9,759,277 B2
(45) Date of Patent: Sep. 12, 2017

(54) SHIM ASSEMBLY FOR DISK BRAKE

(71) Applicant: AKEBONO BRAKE INDUSTRY CO., LTD., Tokyo (JP)

(72) Inventors: Naoko Kobayashi, Tokyo (JP); Daisuke Kobayashi, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/939,274

(22) Filed: Nov. 12, 2015

(65) Prior Publication Data
US 2016/0146276 A1    May 26, 2016

(30) Foreign Application Priority Data
Nov. 21, 2014  (JP) ................................. 2014-236581

(51) Int. Cl.
*F16D 65/095*    (2006.01)
*F16D 65/00*     (2006.01)
*F16D 65/097*    (2006.01)

(52) U.S. Cl.
CPC ..... *F16D 65/0006* (2013.01); *F16D 65/0971* (2013.01)

(58) Field of Classification Search
CPC ............ F16D 65/0971; F16D 65/0977; F16D 65/0979; F16D 65/0006
See application file for complete search history.

(56) References Cited

U.S. PATENT DOCUMENTS

| 5,975,252 A * | 11/1999 | Suzuki ............... F16D 55/227 188/1.11 W |
| 2006/0027427 A1 | 2/2006 | Anda et al. |
| 2006/0157307 A1 | 7/2006 | Tsurumi et al. |
| 2009/0000880 A1* | 1/2009 | Noguchi ............. F16D 65/0971 188/71.7 |

(Continued)

FOREIGN PATENT DOCUMENTS

| JP | 2006-200560 A | 8/2006 |
| JP | A-2007-085439 | 4/2007 |
| JP | 2013-061012 A | 4/2013 |

OTHER PUBLICATIONS

Extended European Search Report issued on May 2, 2016 in corresponding European patent application 15195067.2 (7 pages).

*Primary Examiner* — Bradley King
(74) *Attorney, Agent, or Firm* — Drinker Biddle & Reath LLP

(57) ABSTRACT

A shim assembly for a disk brake includes inside shim locking pieces which are provided in an inside shim main body of the inside shim plate and bent toward the pressure plate so that displacement of the inside shim plate in radial and peripheral directions is restricted and outside shim locking pieces which are provided in an outside shim main body of the outside shim plate and bent toward the pressure plate so that displacement of the outside shim plate in the peripheral direction is allowed and displacement thereof in the radial direction is restricted. Engaging pawls are provided in the inside shim main body and projected from a peripheral edge of the pressure plate. The outside shim locking pieces are respectively engaged with the engaging pawls so as to cover the engaging pawls, to prevent the outside shim plate against separation from the inside shim plate.

2 Claims, 14 Drawing Sheets

(56) References Cited

U.S. PATENT DOCUMENTS

2013/0068574 A1\* 3/2013 Arbesman ........... F16D 65/0971
    188/73.37
2014/0360822 A1 12/2014 Kobayashi et al.
2015/0354646 A1\* 12/2015 Osada ................. F16D 65/0971
    188/73.37

\* cited by examiner

Fig. 9 —Prior Art—

Fig. 10
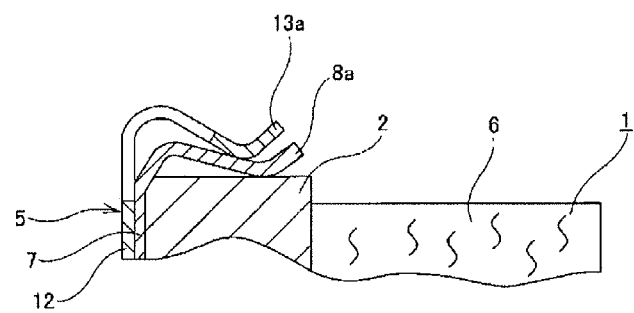
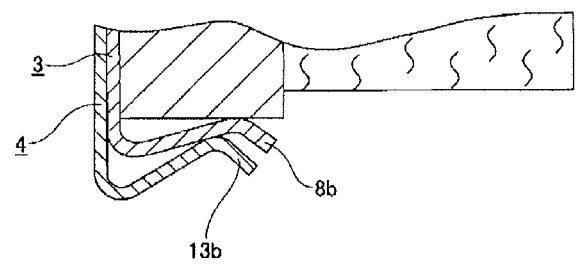
--Prior Art--

--Prior Art--

SHIM ASSEMBLY FOR DISK BRAKE

CROSS REFERENCE TO RELATED APPLICATIONS

This application is based on Japanese Patent Application (No. 2014-236581) filed on Nov. 21, 2014, the contents of which are incorporated herein by reference.

BACKGROUND

The invention relates to an improved shim assembly for a disk brake which is incorporated into a disk brake used to brake a vehicle to reduce brake squeal produced by vibration of a pad in braking and to reduce uneven abrasion of a lining of the pad.

A disk brake used to brake a vehicle is structured such that a pair of pads are arranged across a rotor rotatable together with a wheel and, in braking, the pads are pressed against the two axial side surfaces of the rotor. The basic structure of such disk brake includes two types, that is, a floating type and an opposed piston type. In any structure, in braking, a rotor rotating together with the wheel is firmly pinched from the two axial sides thereof by a pair of pads. The two pads have their linings attached to the front surface of a pressure plate having sufficient rigidity. In braking, the pads press the back surface of the pressure plate to thereby cause the front surfaces of the linings and the two axial side surfaces of the rotor to rub each other.

Here, in the specification and claims of the invention, "an axial direction", "peripheral direction" and "radial direction" mean, unless otherwise specified, the "axial direction", "peripheral direction" and "radial direction" of a rotor when a shim assembly for disk brake is assembled to a disk brake. Also, "peripheral edge" means the "inner or outer peripheral edge" of the rotor in the radial direction.

In braking, a frictional force receiving portion, namely, a contact portion between the rotor two axial side surfaces and the front surfaces of the pad linings, and an anchor portion for supporting brake toque applied to the pads, namely, a contact portion between the pressure plate and a support or a caliper, deviate axially from each other at least by an amount equivalent to the thickness of the pad linings. And, according to the deviation amount equivalent to the thickness, the pads receive moment in a direction where the turn-in sides of the rotor approach each other (fall down on each other), whereby the attitudes of the pads are easy to be unstable. In braking, when the attitudes of the pads get unstable, the movements of the pads are hard to be smooth, thereby causing the pads to vibrate. Thus, noises called squeals can occur and the degree of uneven abrasion of the linings increases greatly.

To ease such squeals and uneven abrasion, conventionally, a shim plate is widely held between the back surface of a pressure plate constituting the pad and the tip end face of a piston or the inside surface of a caliper pawl part serving as a pressure surface for pressing such back surface. Such shim plate has a simple plate structure but, to enhance the squeal and uneven abrasion reduction effect, there is widely used a two-plate structure in which inside and outside shim plates are superimposed on top of each other. Also, there is conventionally known a structure in which the inside and outside shim plates are combined together such that, while being prevented against separation in the thickness direction, they can displace in the peripheral direction.

For example, the patent document 1 discloses a structure shown in FIGS. 9 to 12 as a two-plate structure shim assembly. In the illustrated example, a shim assembly 5 constituted of an inside shim plate 3 and an outside shim plate 4 is mounted on the back surface of a pressure plate 2 constituting a pad 1. The pad 1 is formed such that a lining 6 is attached and fixed to the front surface (which, when mounting the assembly to the disk brake, is opposed to the side surface of the rotor) of the pressure plate 2 with a large connecting force in a manner to be prevented against movement by brake torque applied in braking. The inside shim plate 3 is made of a metal plate and includes a flat plate-shaped inside shim main body 7 and three inside shim locking pieces 8a, 8b, 8c formed bent toward the pressure plate 2 in a total of three portions, namely, the peripheral-direction central portion of the outer peripheral edge and the peripheral-direction two near-to-end portions of the inner peripheral edge of the inside shim main body 7. The inside shim main body 7 has multiple opening-holes 9, 9 for holding grease. Also, the tip half portion of each of the inside shim locking pieces 8a, 8b, 8c is formed such that the axial-direction middle portion thereof is bent toward the peripheral edge of the pressure plate 2, thereby providing a substantially [doglegged] shape.

The pressure plate 2 includes, in the radial direction, an radially-outer-side locking recess 10 formed in the peripheral-direction central portion of the outer peripheral edge thereof, and a pair of steps 11, 11 formed in the peripheral-direction near-to-end two portions of the inner peripheral edge thereof. While the inside shim locking piece 8a on the radially-outer-side is engaged into the radially-outer-side locking recess 10 and the inside shim locking pieces 8b, 8c on the radially-inner-side are engaged into the steps 11, 11, the inside shim plate 3 holds the pressure plate 2 from both sides in the radial direction through the inside shim locking pieces 8a, 8b, 8c. In this state, the inside shim plate 3 is mounted on the back side of the pressure plate 2 while it is restricted (substantially prevented) against displacement in the peripheral and radial directions.

The outside shim plate 4 is made of a metal plate, and includes a flat plate-shaped outside shim main body part 12 and three outside shim locking pieces 13, 13b, and 13c. In the tip half portion of each of the outside shim locking pieces 13, 13b, and 13c as well, the axial-direction middle section thereof is bent toward the peripheral edge of the pressure plate 2, thereby providing a substantially [doglegged] shape. While the outside shim locking pieces 13, 13b, and 13c are overlapped with the inside shim locking pieces 8a, 8b and 8c respectively, the outside shim main body part 12 of the outside shim plate 4 are overlapped with the inside shim main body 7. In this case, the projecting portions of the tip half portion inner surfaces (surfaces opposed to the peripheral edge of the pressure plate 2) of the outside shim locking pieces 13, 13b, and 13c are elastically engaged into the recesses of the tip half section outer surface (surface opposite to the peripheral edge of the pressure plate 2). Thus, the outside shim plate 4 is mounted on the inside shim plate 3 in such a manner that it is prevented against separation in the axial direction (thickness direction) and can displace in the peripheral direction. For this purpose, the peripheral-direction width dimension of the outside shim locking piece 13a is set smaller than the peripheral-direction width dimension of the inside shim locking piece 8a, and the distance between the peripheral-direction outside edges (which are opposite to each other) of the two outside shim locking pieces 13b, 13c is set smaller than the distance between the two steps 11, 11.

In the above-structured first conventional structure, since the inside shim locking pieces 8a, 8b, 8c and the outside shim locking pieces 13, 13*b*, 13*c* are overlapped respectively, the amounts of projection of the outside shim locking pieces 13, 13*b*, and 13*c* from the peripheral edge of the pressure plate 2 are large. This requires consideration for interference with the other composing member of the disk brake, for example, a caliper. The restricted installation space of the disk brake requires large rigidity of the composing part such as the caliper. Thus, the need of consideration for interference prevention raises a disadvantage in securing the freedom of design of the disk brake.

In view of the above circumstances, for example, the patent document 2 discloses a shim assembly 5*a* shown in FIGS. 13 and 14 which can reduce the amount of projection from the peripheral edge of a pressure plate 2*a*. In the second conventional structure, of the two inner and outer peripheral edges of an inside shim main body part 7*a* constituting an inside shim plate 3*a*, in a total of three portions including the two peripheral-direction near-to-end portions of the outer peripheral edge and the peripheral-direction central portion of the inner periphery edge, there are formed inside shim locking pieces 8*d*, 8*e* and 8*f* respectively bent toward the pressure plate 2*a*. The front half portion inner surfaces of the inside shim locking pieces 8*d*, 8*e* formed on the radially-outer-side are respectively elastically contacted with the two locations of the two peripheral-direction near-to-end portion of the outer peripheral edge of the pressure plate 2*a*. Also, the front half portion inner surface of the inside shim locking pieces 8*f* formed on the radially-inner-side is engaged with an radially-inner-side locking recess 17 formed in the peripheral-direction central portion of the inner peripheral edge of the pressure plate 2*a*.

On the two peripheral-direction ends of the inside shim main body part 7*a*, there are formed a pair of locking bent portions 14, 14 bent raised substantially at right angles toward the opposite side of the pressure plate 2*a*. In the width direction (radial direction) central portions of the base ends of the two locking bent portions 14, 14 to the middle locations, there are formed locking opening-holes 15, 15 respectively. In the near-to-tip ends of the two bent portions 14, 14, there are formed guide inclination portions 16, 16 respectively.

The outside shim plate 4*a* includes a flat plate-shaped outside shim main body 12*a*, three outside shim locking pieces 13*d*, 13*e*, 13*f*, and a pair of locking projection pieces 18, 18. The outside shim locking piece 13*d* formed in the peripheral-direction central portion of the outer peripheral edge of the outside shim main body 12*a* is engaged with an radially-outer-side locking recess 10*a* formed in the peripheral-direction central portion of the outer peripheral edge of the pressure plate 2*a* in such a manner that slight displacement in the peripheral direction is possible. The paired outside shim locking pieces 13*e* and 13*f* formed in the two peripheral-direction near-to-end portions of the outside shim main body 12*a* are respectively engaged with a pair of steps 11 formed in the two peripheral-direction near-to-end portions of the inner peripheral edge of the pressure plate 2*a*. The locking projection pieces 18, 18 formed projecting in the peripheral direction from the radial direction central portions of the two peripheral-direction end edges of the outside shim main body 12*a* are engaged with the two locking opening-holes 15, 15 of the inside shim plate 3*a*, thereby preventing the outside shim plate 4*a* against drop-out.

In the second conventional example, with the above structure, the inside shim plate 3*a* is mounted on the back surface of the pressure plate 2*a* in such a manner that it is positioned in the diametric and peripheral directions; and, the outside shim plate 4*a* is mounted on the inside shim plate 3*a* in such a manner that it is positioned radially and can displace slightly in the peripheral direction. And, since the inside shim locking pieces 8*d*, 8*e*, 8*f* and outside shim locking pieces 13*d*, 13*e*, 13*f* are not overlapped radially, the amounts of projection of the outside shim locking pieces 13*d*, 13*e*, 13*f* from the peripheral edge of the pressure plate 2*a* can be reduced. Therefore, regardless of the structure of a disk brake, the shim assembly 5*a* and the other composing parts of the disk brake are made hard to interfere with each other, thereby enabling enhancement in the freedom of design of the disk brake.

However, in the above-mentioned second conventional structure, the bending direction of the two locking bent portions 14, 14 of the two peripheral-direction end portions of the inside shim plate 3*a* is opposite to that of the inside shim locking pieces 8*d*, 8*e* and 8*f*. This increases the number of working steps when the inside shim plate 3*a* is manufactured by press working, thereby increasing the working cost of the inside shim plate 3*a*. Also, the operation to engage the two locking projection pieces 18, 18 of the outside shim plate 4*a* with the locking opening-holes 15, 15 of the two locking bent portions 14, 14 is also troublesome, thereby raising a possibility of increasing the cost.

[Patent Document 1] JP 2006-200560 A
[Patent Document 2] JP 2013-061012 A

SUMMARY

The invention, in view of the above circumstances, aims at realizing an inexpensive structure which can assemble together two inside and outside shim plates such that they can displace in the peripheral direction relative to each other and are prevented from separating unexpectedly from each other, and also can minimize the amount of projection of a pad from the two inner and outer peripheral edges of a pressure plate.

According to one advantageous aspect of the present invention, there is provided a shim assembly for a disk brake comprising:

an inside shim plate configured to be mounted onto a back surface of a pressure plate of a pad for a disk brake, and including a flat plate-shaped inside shim main body;

an outside shim plate including a flat plate-shaped outside shim main body overlapped with the inside shim main body of the inside shim plate;

a plurality of inside shim locking pieces, provided in a peripheral edge of the inside shim main body of the inside shim plate, and bent toward the pressure plate so as to be elastically contacted with the peripheral edge of the pressure plate, so that the inside shim plate is mounted onto the back surface of the pressure plate in a state that displacement of the inside shim plate in radial and peripheral directions is restricted;

outside shim locking pieces, provided in a peripheral edge of the outside shim main body of the outside shim plate, and bent toward the pressure plate so as to be contacted with or adjacently oppose to portions of the peripheral edge of the pressure plate which are positioned out of portions thereof which the inside shim locking pieces contact, so that the outside shim plate is overlapped with a back surface of the inside shim plate in a state that displacement of the outside shim plate in the peripheral direction is allowed and displacement of the outside shim plate in the radial direction is restricted; and engaging pawls, provided in portions of the peripheral edge of the inside shim main body which are positioned out of portions thereof where the inside shim locking pieces are formed, each of which having a flat plate shape as a whole or having a tip end bent toward the pressure plate, and projected from the peripheral edge of the pressure plate in a state that the inside shim plate is mounted on the pressure plate, wherein the outside shim locking pieces are respectively engaged with the engaging pawls so as to cover the engaging pawls, to prevent the outside shim plate against separation from the inside shim plate.

The shim assembly may be configured such that: at least one engaging pawl is provided in an outer peripheral edges of the inside shim main body; at least one engaging pawl is provided in an inner peripheral edges of the inside shim main body; the outside shim locking piece provided in an outer peripheral edge of the outside shim main body is engaged with the engaging pawl formed in the outer peripheral edge of the inside shim main body so as to cover the engaging pawl formed in the outer peripheral edge of the inside shim main body from outward in the radial direction; and the outside shim locking piece provided in an inner peripheral edge of the outside shim main body is engaged with the engaging pawl provided in the inner peripheral edge of the inside shim main body so as to cover the engaging pawl provided in the inner peripheral edge of the inside shim main body from outward in the radial direction.

In the shim assembly, one engaging pawl may be provided in the outer peripheral edge of the inside shim main body, and two engaging pawls may be provided in the inner peripheral edge of the inside shim main body.

BRIEF DESCRIPTION OF DRAWINGS

FIG. 10 is a partially omitted back view of the first conventional shim assembly, taken along the B-O-O-B line of FIG. 9.

DETAILED DESCRIPTION OF EXEMPLIFIED EMBODIMENTS

Figure 1:
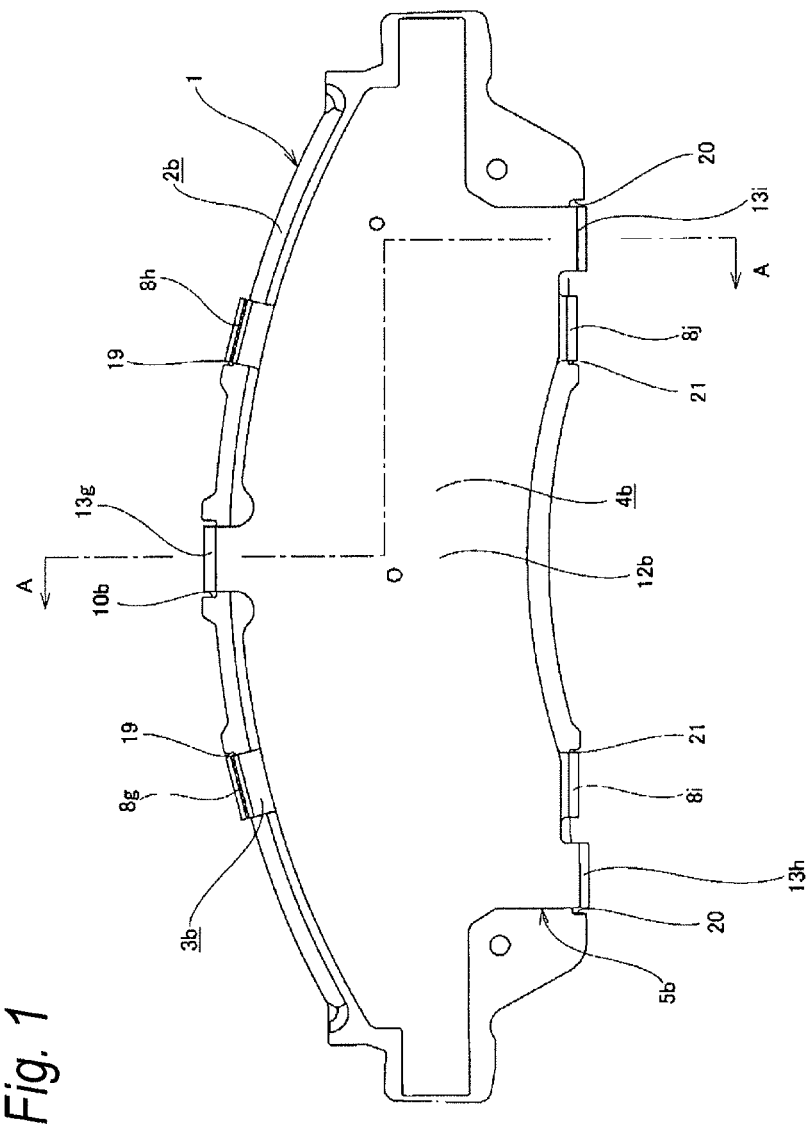
FIG. 1 is a back view of a shim assembly according to an embodiment of the invention, while it is mounted on a pad.
Figure 2:
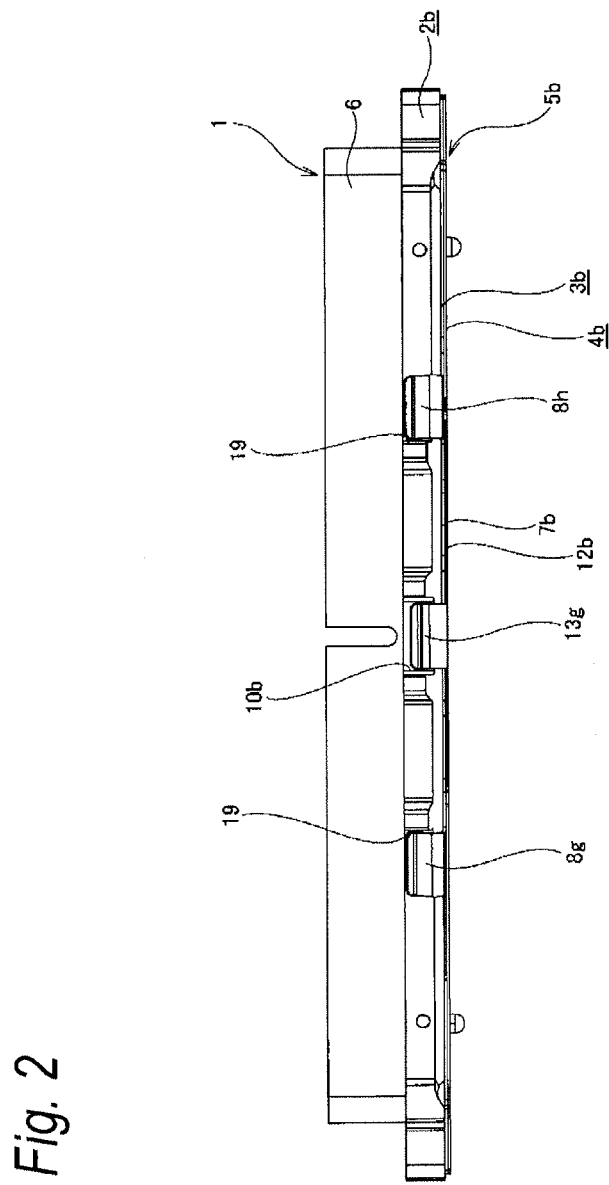
FIG. 2 is a plan view of the shim assembly.
Figure 3:
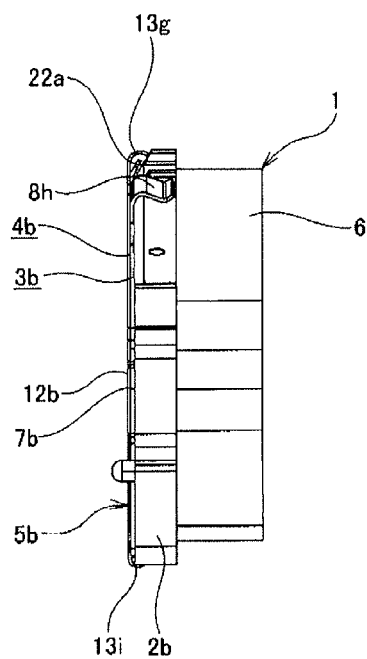
FIG. 3 is a side view of the shim assembly when viewed from the right side of FIG. 1.
Figure 4:
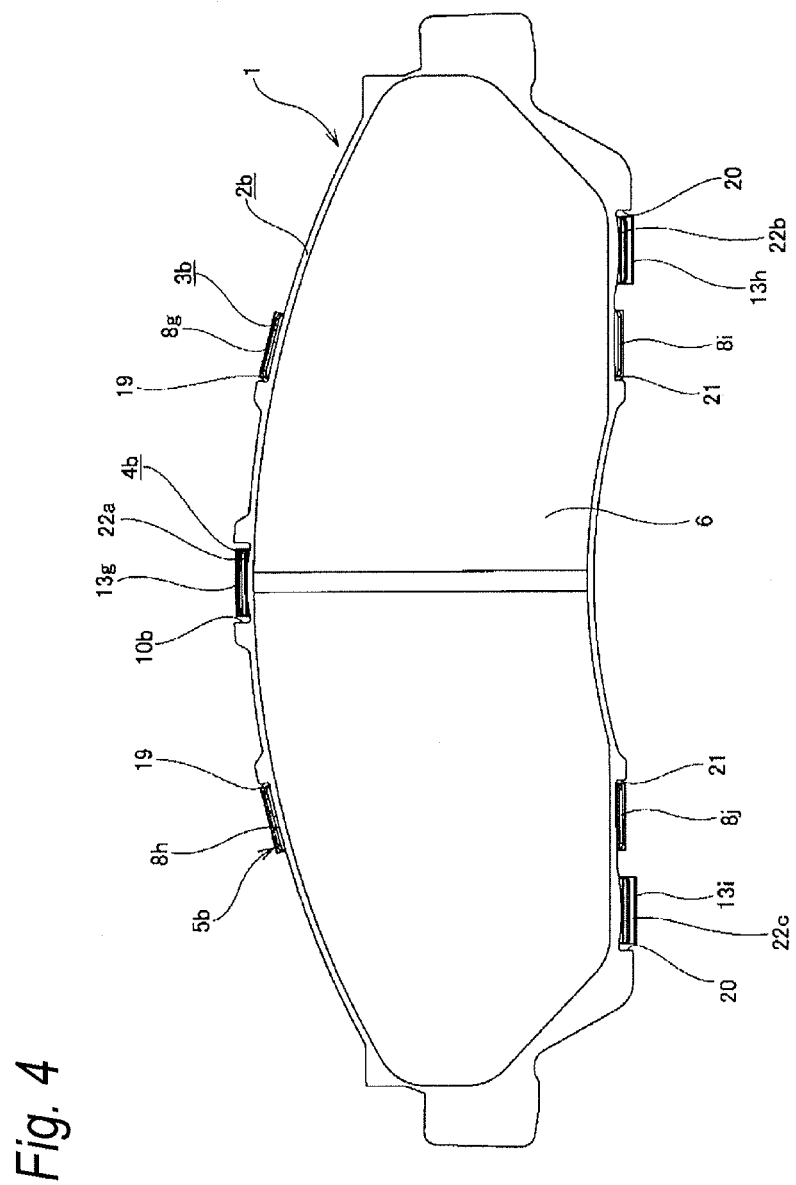
FIG. 4 is a front view of the shim assembly.
Figure 5:
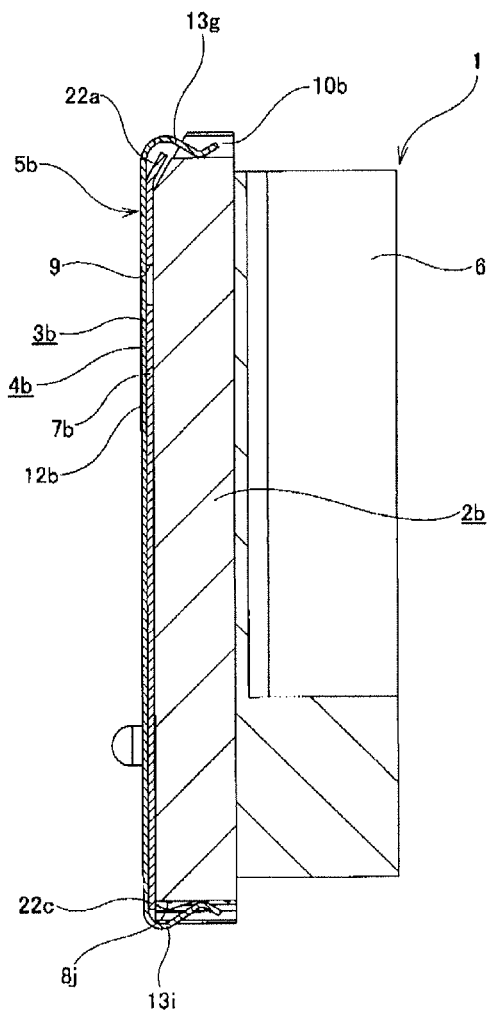
FIG. 5 is a section view taken along the A-O-O-A line of FIG. 1.
Figure 6:
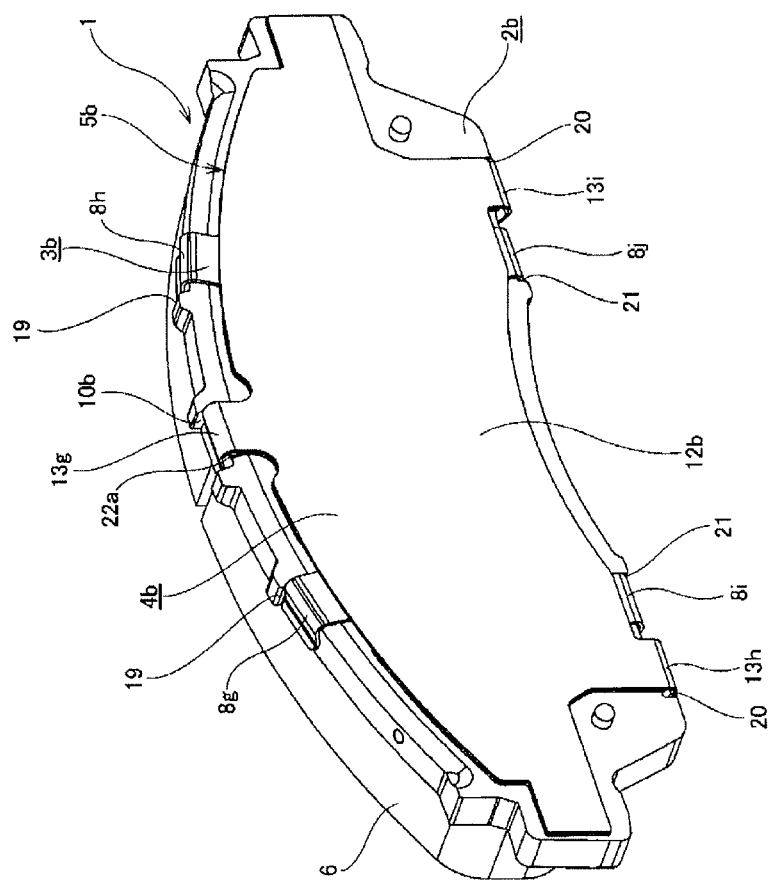
FIG. 6 is a perspective view of the shim assembly, when viewed from the back side and from outward in the radial direction.
Figure 7:
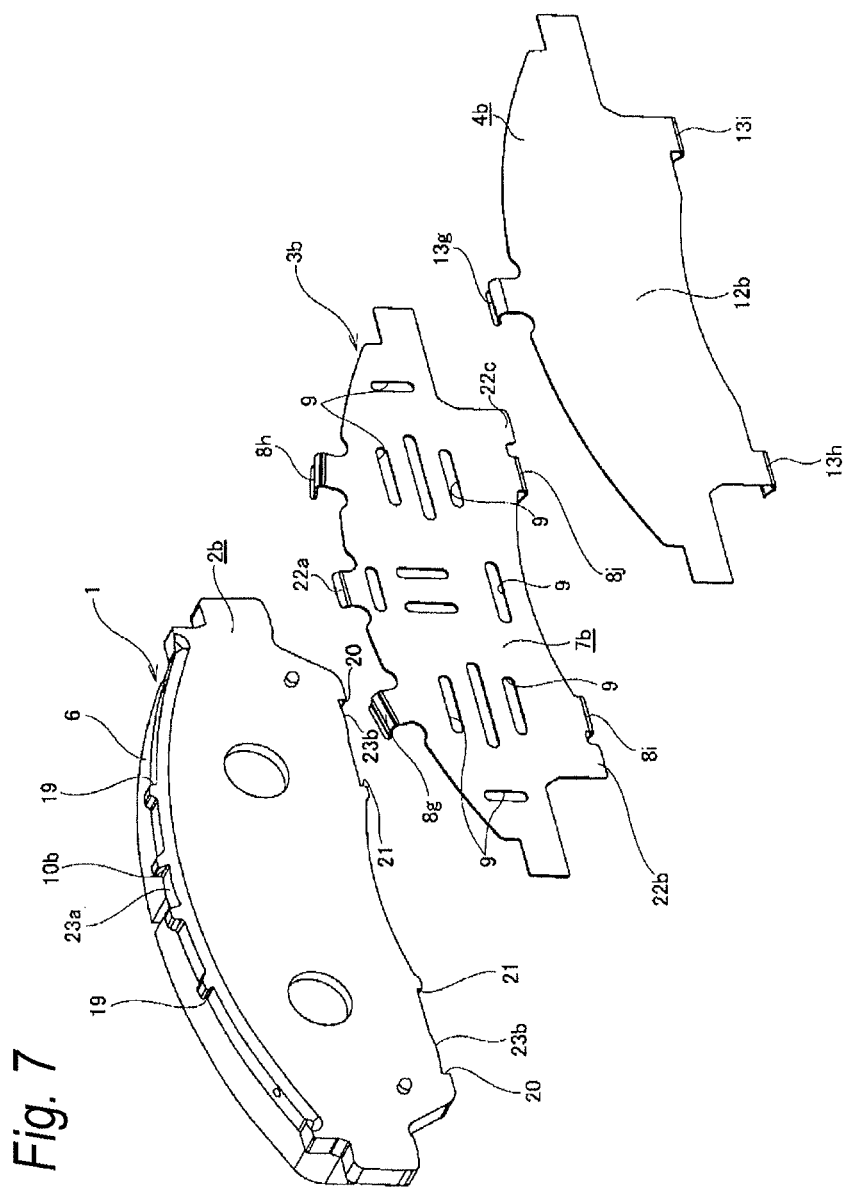
FIG. 7 is an exploded perspective of the shim assembly.
Figure 8:
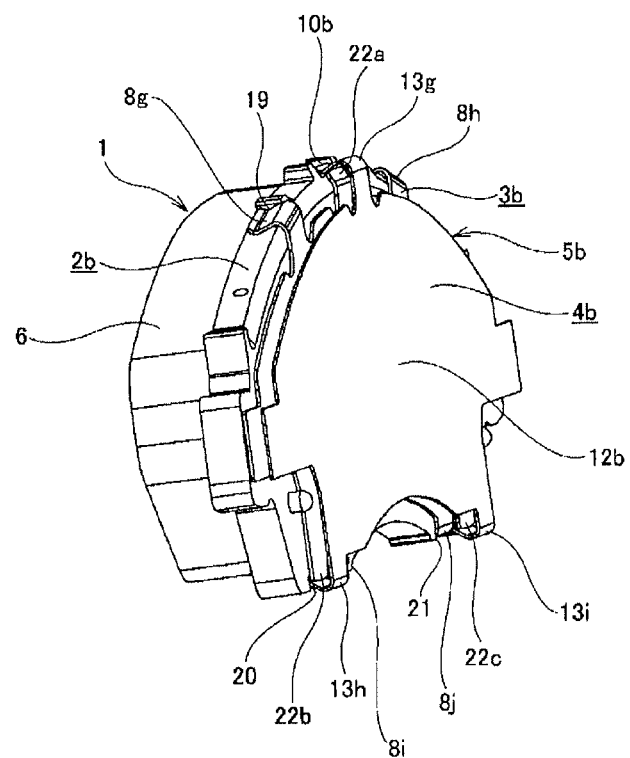
FIG. 8 is a perspective view of the shim assembly, when viewed from the back side and from one side in the peripheral direction.
Figure 9:
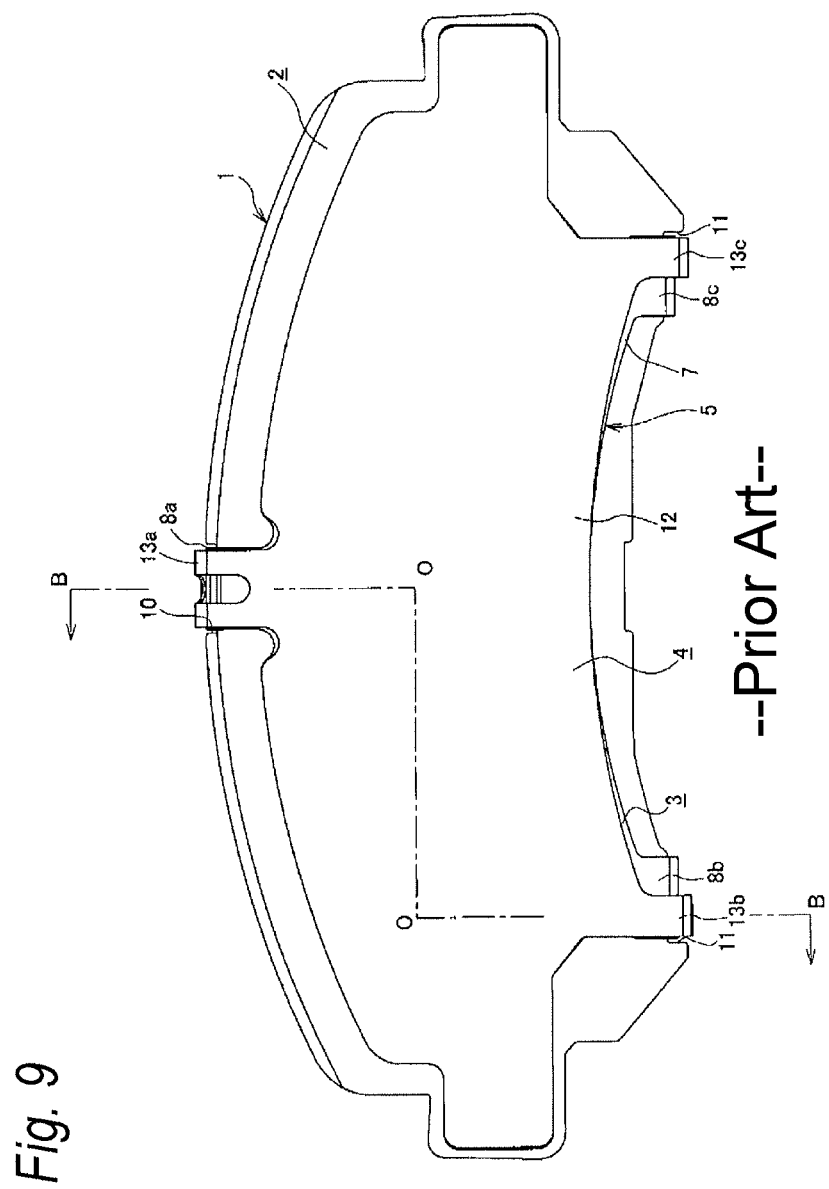
FIG. 9 is a back view of a shim assembly according to a first example of a conventional structure, while it is mounted on a pad.
Figure 11:
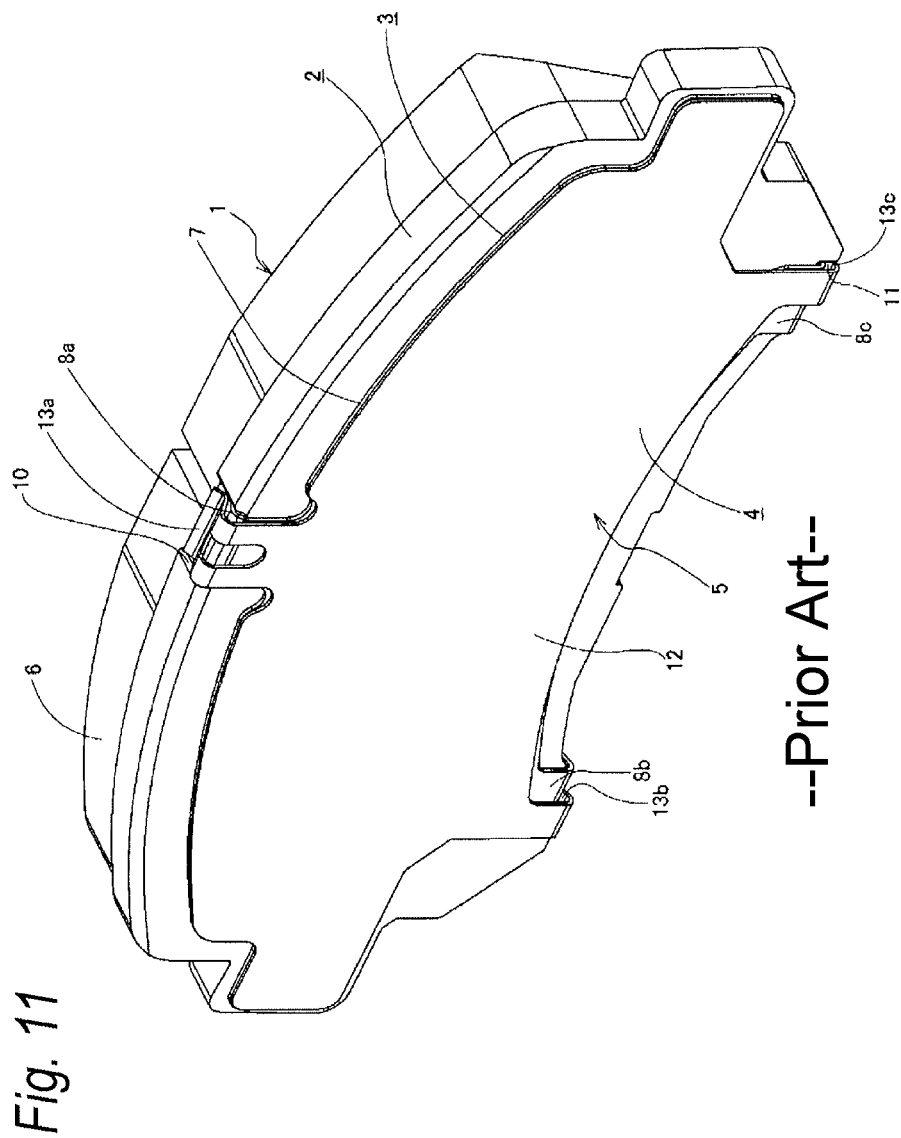
FIG. 11 is a perspective view of the first conventional shim assembly, when viewed from the back side and from outward in the radial direction.
Figure 12:
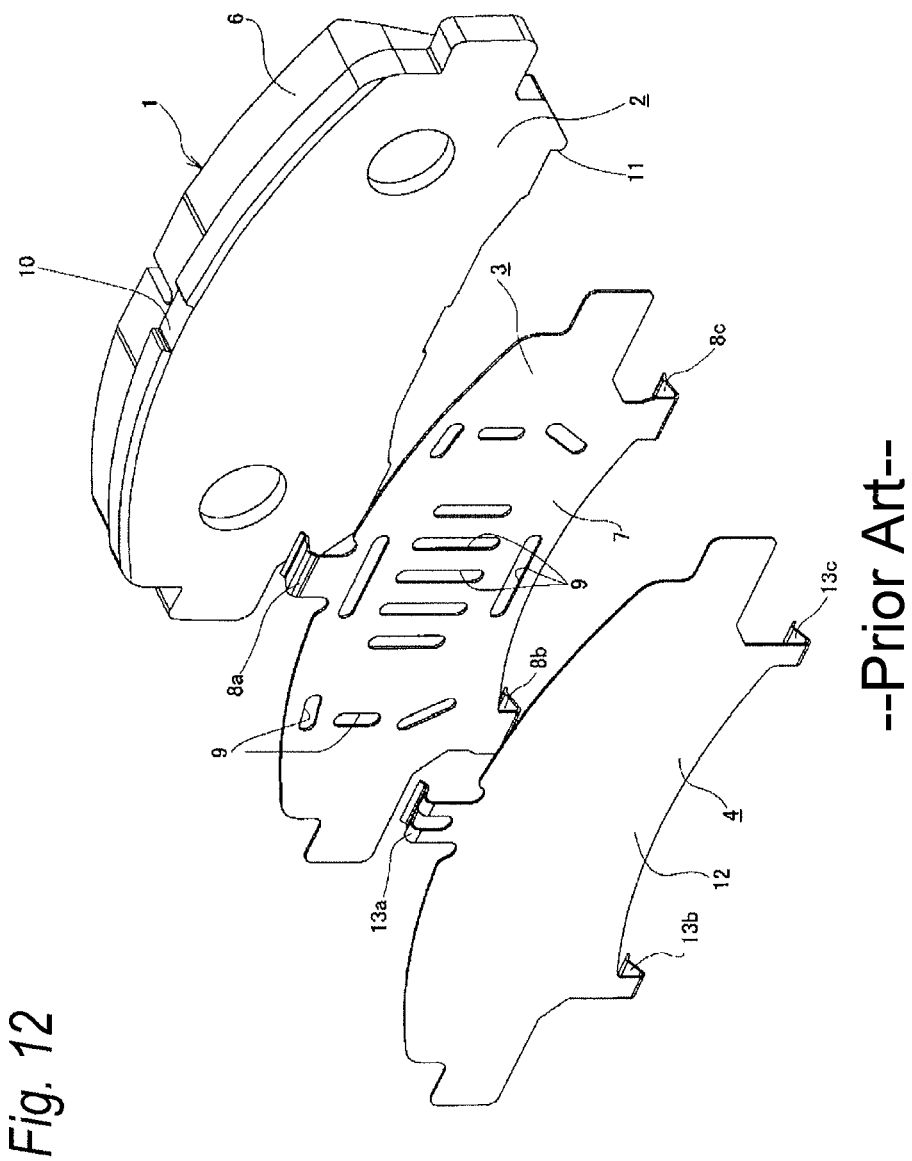
FIG. 12 is an exploded perspective of the first conventional shim assembly.

Description is given of an embodiment of the invention with reference to FIGS. 1 to 8. A shim assembly 5b for a disk brake of this embodiment includes an inside shim plate 3b and an outside shim plate 4b, and is mounted onto a pad 1. The pad 1 includes a pressure plate 2b and a lining 6 attached and fixed to the front surface of the pressure plate 2b, and is arranged in a portion opposed to the axial side surface of a rotor. The pressure plate 2b includes, in the peripheral-direction central portion of the outer peripheral edge thereof, a radially-outer-side locking recess 10b which includes, in the peripheral-direction two side portions thereof, a pair of radially-outer-side steps 19 and 19 respectively having a side surface facing outward in the peripheral direction. The pressure plate 2b also includes, in the peripheral-direction two near-to-end portions of the inner peripheral edge thereof, a pair of radially-inner-side first steps 20 and 20 respectively having a side surface facing inward in the peripheral direction, and, in the portions thereof nearer to the peripheral-direction center thereof than the first steps 20, 20, a pair of radially-inner-side second steps 21 and 21 respectively having a side surface facing outward in the peripheral direction. And, the peripheral-direction outside surfaces of the second steps 21, 21 and the peripheral-direction inside surfaces of the first steps 20, 20 are opposed to each other in the peripheral direction.

To form the inside shim plate 3b, an anticorrosive and elastic metal plate such as a spring stainless steel plate or a spring stainless steel plate coated with rubber on a surface opposed to the back surface of the pressure plate 2b may be punched, or bent, or wire-cut by press working. The inside shim plate 3b includes an inside shim main body 7b, four inside shim locking pieces 8g, 8h, 8i, 8j and three engaging pawls 22a, 22b, 22c.

The shim main body 7b is formed in a flat plate shape and includes in its multiple locations opening-holes (long holes) 9, 9 for holding therein grease for lubrication.

Of the two inner and outer peripheral edges of the shim main body 7b, in a total of four locations including two locations between the peripheral-direction central portion and two ends of the outer peripheral edge, and the two locations of the inner peripheral edge existing near to the two peripheral-direction ends thereof, there are formed the four inside shim locking pieces 8g, 8h, 8i, 8j. Each of the inside shim locking pieces 8g, 8h, 8i, 8j includes a flat plate-shaped base half part extending radially from the peripheral edge of the shim main body 7b and a front half part bent toward the pressure plate 2b from the tip end edge of the base half part. The front half part of each of the inside shim locking pieces 8g, 8h, 8i, 8j is bent in the axial-direction middle portion thereof toward the peripheral edge of the pressure plate 2b to provide a substantially "dogleg" shape. In this embodiment, while the two radially-outer-side inside shim locking pieces 8g and 8h at the radially outer side are engaged with the radially-outer-side steps 19 and 19, and the two radially-inner-side inside shim locking pieces 8i and 8j at the radially inner side are engaged with the radially-inner-side second steps 21 and 21, the front half part inner surfaces of the two inside shim locking pieces 8g and 8h are elastically contacted with two locations between the peripheral-direction central portion of the outer peripheral edge of the pressure plate 2b and two ends, and the two inside shim locking pieces 8i and 8j are elastically contacted with two locations near to the peripheral-direction two ends of the inner peripheral edge of the pressure plate 2b. That is, while holding the pressure plate 2*b* from both sides in the radial direction using the radially-outer-side inside shim locking pieces 8*g*, 8*h* and radially-inner-side outside inside shim locking pieces 8*i*, 8*j*, the inside shim main body 7*b* is contacted with the back surface of the pressure plate 2*b*. In this state, the inside shim 3*b* is mounted onto the back surface side of the pressure plate 2*b* in such a manner that its peripheral and radial direction displacement is (substantially) restricted.

Also, of the inner and outer peripheral edges of the inside shim main body 7*b*, in a total of three portions out of the portions of the inside shim locking pieces 8*g*, 8*h*, 8*i*, 8*j*, namely, in a location of the peripheral-direction central portion of the outer peripheral edge and two locations of the two peripheral-direction ends of the inner peripheral edge, there are formed the engaging pawls 22*a*, 22*b* and 22*c*. Of the engaging pawls 22*a*, 22*b* and 22*b*, the engaging pawl 22*a* formed on the radially-outer-side includes a flat plate-shaped base half part and a front half part bent about 20 to 30 degrees toward the pressure plate 2*b* as it goes toward its tip end. Meanwhile, two engaging pawls 22*b* and 22*c* are formed as a flat plate shape as a whole. Also, with the inside shim plate 3*b* mounted on the back surface of the pressure plate 2*b*, the tip end edges of the engaging pawls 22*a*, 22*b* and 22*c* slightly project radially from the peripheral edge of the pressure plate 2*b*.

The outside shim plate 4*b* is formed by blanking, or bending or wire-cutting an anticorrosive and elastic metal plate such as a spring stainless steel plate by press working, and includes a flat plate-shaped outside shim main body 12*b* to be overlapped with the inside shim main body 7*b* of the inside shim plate 3*b*, and three outside shim locking pieces 13*g*, 13*h* and 13*i*. Of the inner and outer inner peripheral edges of the outside shim main body 12*b*, in the peripheral-direction central portion of the outer peripheral edge, there is formed one outside locking piece 13*g*; and, in the two peripheral-direction ends of the inner peripheral edge, there are formed two outside shim locking pieces 13*h* and 13*i*. Each of the outside shim locking pieces 13*g*, 13*h* and 13*i* includes a flat plate-shaped base half part extending radially from the peripheral edge of the outside shim main body 12*b* and a front half part bent toward the pressure plate 2*b* from the tip end edge of the base half part. The front half part of each of the outside shim locking pieces 13*g*, 13*h* and 13*i* also is bent in the axial-direction middle portion thereof toward the peripheral edge of the pressure plate 2*b* to provide a substantially "dogleg" shape. In this embodiment, while the radially-outer-side outside shim locking piece 13*g* is engaged with the radially-outer-side locking recess 10*b* and the two radially-inner-side outside shim locking pieces 13*h* and 13*i* are engaged with the radially-inner-side first steps 20 and 20 in such a manner that the peripheral-direction slight displacement thereof is allowed, the front half part inner surface of the piece 13*g* is contacted or adjacently opposed to the outer peripheral edge of the pressure plate 2*b* in the portion of the radially-outer-side locking recess 10*b*, and the two pieces 13*h* and 13*i* at the radially inner side are contacted or adjacently opposed to the two locations of the pressure plate 2*b* existing near the two peripheral-direction ends thereof. That is, the outside shim locking pieces 13*g*, 13*h* and 13*i*, while ensuring the radial direction positioning of the outside shim plate 4*b* relative to the pressure plate 2*b*, may only enable the outside shim plate 4*b* to displace in the peripheral direction, but the outside shim plate 4*b* must not always be elastically contacted with the peripheral edge of the pressure plate 2*b*.

Especially, in this embodiment, the radially-outer-side outside shim locking piece 13*g* is engaged with the radially-outer-side locking recess 10*b* and is also engaged with the tip end edge of the radially-outer-side engaging pawl 22*a* of the inside shim plate 3*b* in such a manner that it covers the engaging pawl 22*a* from outward in the radial direction. And, the two radially-inner-side outside shim locking pieces 13*h* and 13*i* are engaged with the radially-inner-side first steps 20 and 20 and are also engaged with the tip end edges of the radially-inner-side engaging pawls 22*b* and 22*c* of the inside shim plate 3*b* in a manner to cover the engaging pawls 22*b* and 22*c* from inward in the radial direction. Such engaging operation can be performed easily while elastically deforming the pieces 13*g*, 13*h* and 13*i* through their contact with the tip ends of the engaging pawls 22*a*, 22*b* and 22*c*. In this embodiment, with this structure, while preventing separation of the outside shim plate 4*b* from the inside shim plate 3*b*, the outside shim plate 4*b* is mounted on the inside shim plate 3*b* in such a manner that radial direction positioning is ensured and slight displacement in the peripheral direction is allowed. Also, with this embodiment, in such mounted state, the amount of the radial direction outward projection of the outside shim locking piece 13*b* from the outer periphery (circumscribed circle) of the pressure plate 2*b*, similarly to the conventional first structure, can be sufficiently reduced when compared with a structure in which inside and outside shim locking pieces are overlapped.

Here, the two shim plates 3*b* and 4*b*, after previously assembled together (as a shim assembly 5*b*), may be assembled to the pressure plate 2*b*, or the inside shim plate 3*b* and outside shim plate 4*b* may be assembled sequentially to the pressure plate 2*b*.

Also, in this embodiment, in order to minimize resistance caused when the outside shim plate 4*b* is displaced in the peripheral direction relative to the pressure plate 2*b* and the front half part inner surfaces of the outside shim locking pieces 13*g*, 13*h* and 13*i* are thereby rubbed against the peripheral edge of the pressure plate 2*b*, the shapes of the respective composing parts are improved. Specifically, the peripheral-direction shapes of the outside shim locking pieces 13*g*, 13*h* and 13*i* are formed as straight line shapes parallel to each other and, in such portions of the peripheral edge of the pressure plate 2*b* as are rubbed against the front half part inner surfaces, there are formed partially cylindrical surface shaped projections 23*a*, 23*b* respectively.

Therefore, the front half part inner surfaces of the outside shim locking pieces 13*g*, 13*h* and 13*i* are contacted with the top portions (portions projecting most in the radial direction) of the projections 23*a*, 23*b*, while the peripheral-direction position of the outside shim plate 4*b* relative to the pressure plate 2*b* is defined as a neutral position. In this state, the peripheral-direction side edges of the front half parts of the outside shim locking pieces 13*g*, 13*h* and 13*i* are separated from the peripheral edge of the pressure plate 2*b*. In other words, the peripheral-direction side edges of the front half parts of the outside shim locking pieces 13*g*, 13*h* and 13*i*, which are sharp end edges, are not contacted with the peripheral edge of the pressure plate 2*b*.

According to the above-structured shim assembly 5*b* for a disk brake of the embodiment, there can be realized an inexpensive structure which can assemble together the inside and outside shim plates 3*b* and 4*b* in such a manner that they can displace relative to each other in the peripheral direction and can be prevented from separating unexpectedly from each other, and also can minimize the amount of projection of the locking pieces from the inner and outer peripheral edges of the pressure plate 2*b* the pad 1.

That is, in the shim assembly 5b of the embodiment, the engaging pawls 22a, 22b and 22c are arranged at the positions out of the inside shim locking pieces 8g, 8h, 8i and 8j provided for mounting the inside shim plate 3b onto the pressure plate 2b. And, the outside shim locking pieces 13g, 13h and 13i formed in the outside shim plate 4b are engaged with the engaging pawls 22a, 22b and 22c in such a manner that the former cover the latter from the radial direction, thereby preventing the inside and outside shim plates 3b and 4b against mutual separation. Thus, unlike the first conventional structure shown in FIGS. 9 to 12, the inside shim locking pieces 8g, 8h, 8i, 8j provided in the inside shim plate 3b and the outside shim locking pieces 13g, 13h and 13i provided in the outside shim plate 4b need not be overlapped with each other. This can minimize the amount of projection of the outside shim locking pieces 13g, 13h and 13i from the peripheral edges of the pressure plate 2b. Consequently, regardless of the structure of a disk brake (whether it is a floating type or an opposed piston type, and, regardless of the number of pistons), the shim assembly 5b for a disk brake and the other composing parts of the disk brake are hard to interfere with each other, thereby enabling enhancement in the freedom of design of the disk brake.

Figure 13:
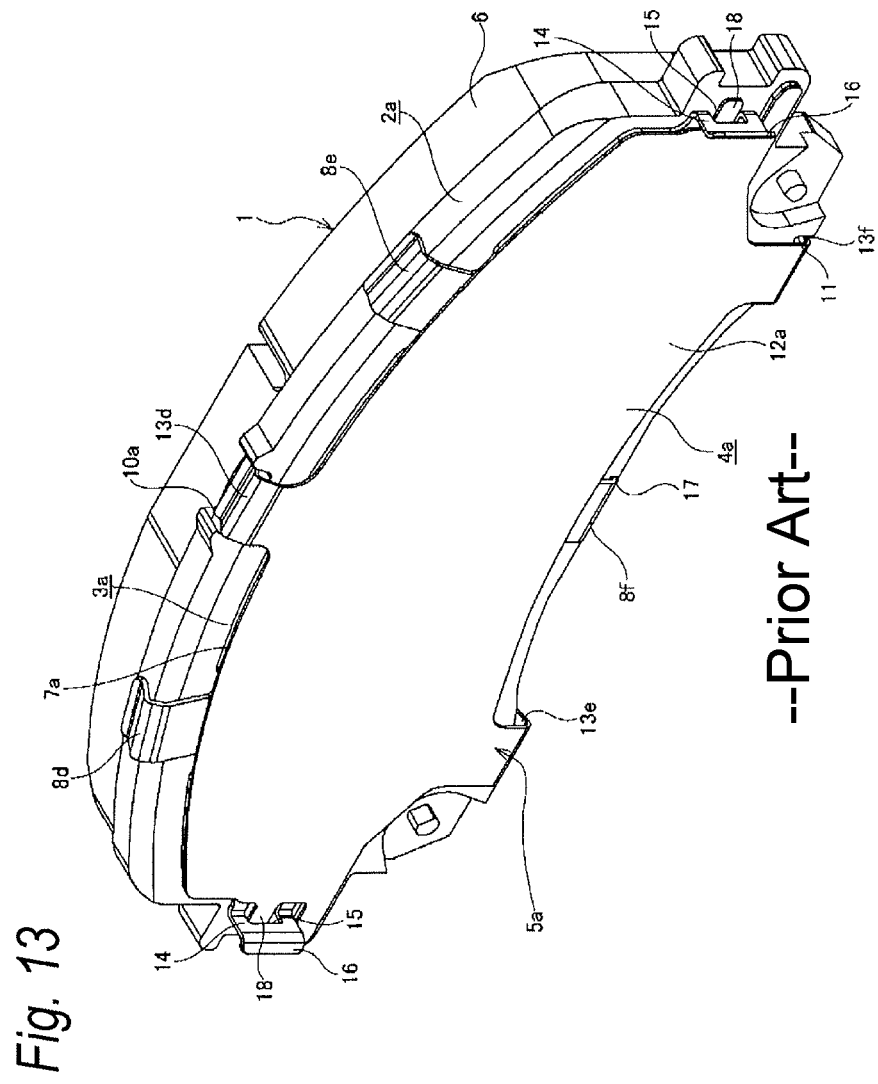
FIG. 13 is a perspective view of a shim assembly according to a second example of the conventional structure while it is mounted on a pad, when viewed from the back side and from outward in the radial direction.
Figure 14:
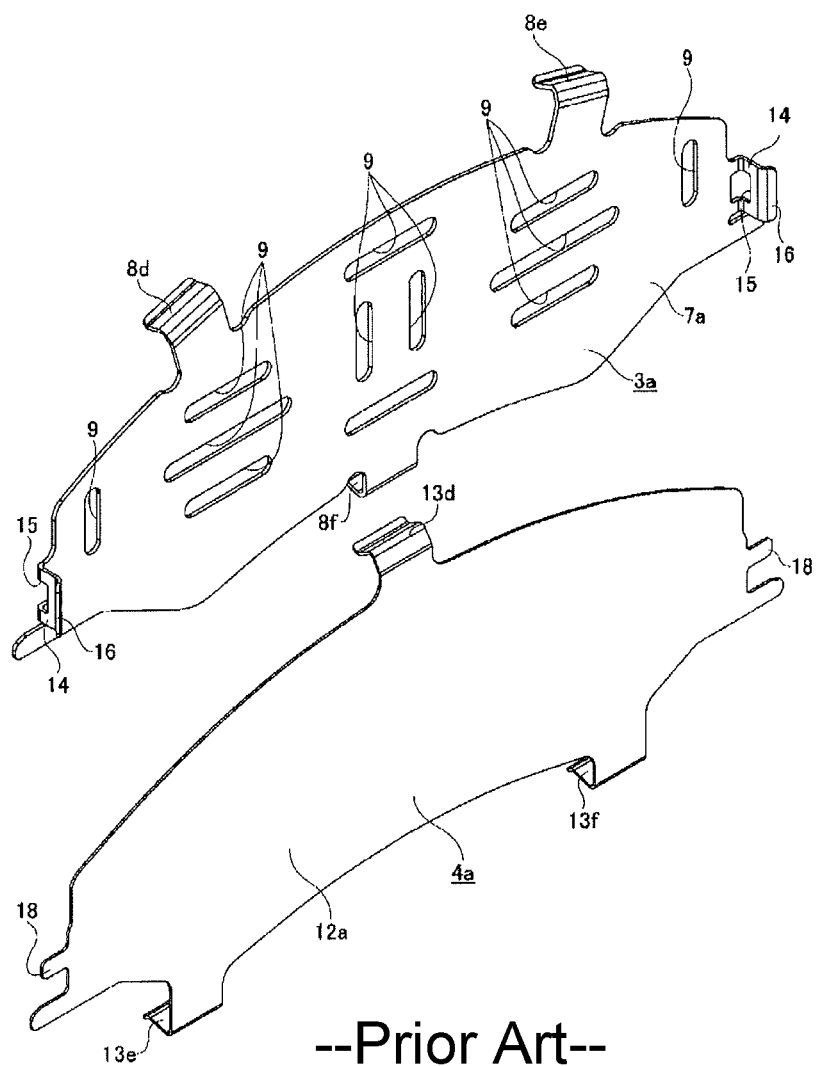
FIG. 14 is an exploded perspective view of the second conventional example.

Further, in this embodiment, for prevention of mutual separation of the inside and outside shim plates 3b and 4b, the engaging pawls 22a, 22b and 22c each having a flat plate shape or bent in the same direction as the inside shim locking pieces 8g, 8h, 8i, 8j may only be formed, thereby, unlike the second conventional structure shown in FIGS. 13 and 14, eliminating the need to form in the inside shim plate 3b locking bent portions bent oppositely to the inside shim locking pieces 8g, 8h, 8i, 8j. Thus, even when the inside shim plate 3b is manufactured by pressing or by wire cutting, an increase in the cost can be prevented. The operation to engage the outside shim locking pieces 13g, 13h and 13i with the engaging pawls 22a, 22b and 22c can also be facilitated by contacting the outside shim locking pieces 13g, 13h and 13i with the tip ends of the engaging pawls 22a, 22b and 22c to thereby elastically deform these pieces in the radial direction. Particularly, in this embodiment, since the front half part of the engaging pawl 22a provided on the radially-outer-side is bent toward the pressure plate 2b relative to the base half part thereof, the operation to engage the outside shim locking piece 13g with such engaging pawl 22a can be further facilitated. Therefore, according to the structure of this embodiment, an increase in the manufacturing cost of the shim assembly 5b for a disk brake can be restricted sufficiently.

Further, in this embodiment, the inner surfaces of the peripheral-direction ends of the front half parts of the outside shim locking pieces 13g, 13h and 13i provided in the outside shim plate 4b which, according to braking and release of braking, displaces in the peripheral direction relative to the pressure plate 2b are separated from the peripheral edge of the pressure plate 2b. This can prevent the peripheral-direction end edges of the outside shim locking pieces 13g, 13h and 13i from biting into the peripheral edge of the pressure plate 2b, thereby enabling smooth peripheral-direction displacement of the outside shim plate 4b relative to the pressure plate 2b.

According to the above-structured shim assembly for a disk brake of the invention, there can be realized an inexpensive structure which can assemble together two inside and outside shim plates such that they can displace in the peripheral direction relative to each other and are prevented from separating unexpectedly from each other, and also can minimize the amount of projection of the shim plate from the two inner and outer peripheral edges of a pressure plate of a pad.

That is, in the shim assembly for a disk brake of the invention, the engaging pawls are formed in such positions of the inside shim plate as are out of the inside shim locking pieces formed to mount the inside shim plate onto the pressure plate and the outside shim locking pieces formed in the outside shim plate are engaged with the engaging pawls while covering the engaging pawls, thereby preventing the inside and outside shim plates against mutual separation. Thus, unlike the first conventional structure shown in FIGS. 9 to 12, the inside shim locking pieces formed in the inside shim plate and the outside shim locking pieces formed in the outside shim plate may not be overlapped with each other. This can minimize the amount of projection of the locking pieces from the peripheral edge of the pressure plate. Further, in the invention, for prevention of mutual separation between the inside and outside shim plates, the engaging pawls each having a flat plate-shaped shape or bent in the same direction as the inside shim locking pieces may only be formed. Thus, unlike the second conventional structure shown in FIGS. 13 and 14, no locking bent portion bent oppositely to the outside shim locking pieces need not be formed in the inside shim plate. Also, the operation to engage the outside shim locking pieces with the engaging pawls can be facilitated by elastically deforming the outside shim locking pieces through contact with the tip ends of the engaging pawls. Therefore, according to the invention, an increase in the manufacturing cost of the shim assembly for a disk brake can be restricted sufficiently.

The number of shim plates constituting the shim assembly for a disk brake of the invention is not restricted to two. The invention can also apply to a structure which holds a third shim plate (for example, an intermediate shim plate) between a pressure plate and an inside shim plate, or between an inside shim plate and an outside shim plate.

What is claimed is:

1. A shim assembly for a disk brake comprising:
    an inside shim plate configured to be mounted onto a back surface of a pressure plate of a pad for a disk brake, and including a flat plate-shaped inside shim main body;
    an outside shim plate including a flat plate-shaped outside shim main body overlapped with the inside shim main body of the inside shim plate;
    a plurality of inside shim locking pieces, provided on a peripheral edge of the inside shim main body of the inside shim plate, and bent toward the pressure plate so as to be elastically contacted with respective first portions of a peripheral edge of the pressure plate, wherein the inside shim plate is mounted onto the back surface of the pressure plate in a state that displacement of the inside shim plate in radial and peripheral directions is restricted;
    outside shim locking pieces, provided on a peripheral edge of the outside shim main body of the outside shim plate, and bent toward the pressure plate so as to be contacted with or adjacent to respective second portions of the peripheral edge of the pressure plate, wherein each of the first and second portions of the peripheral edge of the pressure plate are separate and distinct portions of the peripheral edge of the pressure plate, and wherein the outside shim plate overlaps a back surface of the inside shim plate in a state that displacement of the outside shim plate in the peripheral direction is allowed and displacement of the outside shim plate in the radial direction is restricted; and engaging members, provided on the peripheral edge of the inside shim main body at respective positions that are different than respective positions of the inside shim locking pieces, each of the engaging members having one of (i) a flat plate shape or (ii) a flat plate shape with a tip end bent toward the pressure plate, wherein each of the engaging members projects from the peripheral edge of the pressure plate when the inside shim plate is mounted on the pressure plate, and wherein the engaging members do not restrict a displacement of the inside shim plate in the peripheral direction, wherein each outside shim locking piece of the outside shim locking pieces is respectively engaged with a respective engaging member of the engaging members so as to cover the engaging members and to prevent separation of the outside shim plate from the inside shim plate when the outside shim plate is mounted on the inside shim plate, wherein at least one engaging member of the engaging members is provided on an outer peripheral edge of the inside shim main body, wherein at least another one engaging member of the engaging members is provided on an inner peripheral edge of the inside shim main body, wherein at least one outside shim locking piece of the outside shim locking pieces is provided on an outer peripheral edge of the outside shim main body, and the at least one outside shim locking piece provided on an outer peripheral edge of the outside shim main body is engaged with the at least one engaging member provided on the outer peripheral edge of the inside shim main body so as to cover the at least one engaging member provided on the outer peripheral edge of the inside shim main body outward in the radial direction, and wherein at least another one outside shim locking piece of the outside shim locking pieces is provided on an inner peripheral edge of the outside shim main body, and the at least another one outside shim locking piece provided on an inner peripheral edge of the outside shim main body is engaged with the at least one engaging member provided on the inner peripheral edge of the inside shim main body so as to cover the at least one engaging member provided on the inner peripheral edge of the inside shim main body outward in the radial direction.

2. The shim assembly according to claim 1, wherein at least two engaging members of the engaging members are provided on the inner peripheral edge of the inside shim main body.

\* \* \* \* \*